United States Patent [19]

Kasamoto

[11] Patent Number: 4,901,091

[45] Date of Patent: Feb. 13, 1990

[54] INK JET RECORDING HEAD AND INK JET RECORDING APPARATUS USING SAME

[75] Inventor: Masami Kasamoto, Hiratsuka, Japan

[73] Assignee: Canon Kabushiki Kaisha, Tokyo, Japan

[21] Appl. No.: 338,423

[22] Filed: Apr. 14, 1989

Related U.S. Application Data

[63] Continuation of Ser. No. 68,791, Jul. 2, 1987, abandoned, which is a continuation of Ser. No. 785,619, Oct. 9, 1985, abandoned.

[30] Foreign Application Priority Data

Oct. 19, 1984 [JP] Japan ............................... 59-218652

[51] Int. Cl.[4] .......................... G01D 15/16; B41J 3/04

[52] U.S. Cl. ................................................ 346/140 R

[58] Field of Search .................................. 346/140, 75

[56] References Cited

U.S. PATENT DOCUMENTS

| | | | |
|---|---|---|---|
| 4,138,687 | 2/1979 | Cha | 346/75 |
| 4,449,135 | 5/1984 | Umezawa | 346/75 |
| 4,544,932 | 10/1985 | Barnett | 346/140 |
| 4,559,543 | 12/1985 | Toganoh | 346/140 R |

*Primary Examiner*—Joseph W. Hartary

*Attorney, Agent, or Firm*—Fitzpatrick, Cella, Harper & Scinto

[57] ABSTRACT

An ink jet recording head comprises a recording head unit, a drive board, a support member having a flat surface supporting the recording head unit and the drive board, and signal feeding apparatus for feeding an electrical drive signal from the drive board to the recording head unit. A groove, in which a sealant is provided, is formed at an interface between the recording head unit and the support member and extends in the direction of the width of the recording head unit.

45 Claims, 3 Drawing Sheets

INK JET RECORDING HEAD AND INK JET RECORDING APPARATUS USING SAME

This application is a continuation of application Ser. No. 068,791 filed July 2, 1987, now abandoned, which in turn is a continuation of application Ser. No. 785,619, filed Oct. 9, 1985, now abandoned.

BACKGROUND OF THE INVENTION

1. Field of the Invention

This invention relates to an ink jet recording head, and more particularly to an ink jet recording head for recording by ejecting a liquid and depositing the resulting flying droplets onto a material to be recorded.

2. Description of the Prior Art

An ink jet recording apparatus for generating ink droplets and depositing the droplets onto a material to be recorded such as paper, etc., thereby carrying out recording has been regarded as important because the recording apparatus generates only negligibly small noise during the recording and can ensure high speed recording on the ordinary paper without any special treatment such as fixation, etc. Recently various types of the apparatuses have been under active study.

One example of a recording head applicable to such an ink jet recording apparatus is shown in FIGS. 1A and 1B, where numeral 1 is a recording head with a discharge energy generating element (not shown), and 2 is a drive board that feeds a discharge signal to the recording head 1. The recording head 1 and the drive board 2 are both provided on a support member 3. To prevent the electrical connection therebetween from any damage due to contamination by exuded ink, etc., a gap groove 4 is provided between the recording head 1 and the drive board 2 to maintain the specific clearance. An insulating adhesive 5 is inserted in the gap groove 4, and an adhesive 7 is inserted in an adhesive opening 6 provided in the support member 3 to fix the recording head 1 to the support member 3.

Numeral 8 denotes signal wires that feed a singnal to the recording head 1 from the drive board 2 and are connected onto bonding pads (not shown in the drawings) provided on both sides across the gap groove 4. The recording head 1 and the drive board 2 are inserted into and supported with a front support plate 9 through an elastic bushing 10, and a capping 12 made of an elastomer is detachably provided on the ink discharge side of the plate 9 to prevent the ink from drying when the recording head 1 is not used.

Ink feed pipes 13 are provided on the recording head 1 and can supply the ink through a recovery pump (a pump used for recoverying ejection of ink when ejection of ink is unintentionally stopped) (not shown in the drawings) during the recovery operation to stabilize printing. That is, the ink can be ejected from a nozzle 1A by forced supply of the ink.

However, when the ink is ejected from the nozzle 1A by the recovery operation in such a conventional ink jet recording head as above, the ejected liquid ink permeates the clearance at the joint surface between the recording head 1 and the support member 3 by the trickling down along the front surface, and the permeating ink exudes onto the side surfaces from the joint surface, while further proceeding around the adhesive 5 in the gap groove 4 to wet the electric connection portion between recording head 1 and drive board 2 and the upper side of drive board 2, generating a short circuit on the drive board.

Furthermore, when the clearance of gap groove 4 is small, it will be not only difficult to apply thereto the adhesive 5 so as to prevent the permeation of the ink, but also the adhesive is liable to deposit on the pads on the side of recording head 1 and that of drive board 2, causing trouble in the connection of the signal wires 8. This leads to waste, whereas when the clearance of gap groove 4 is too large, and when the recording head 1 is higher in density, the density of the signal wires 8 will be also higher and consequently short circuits will be more likely to occur between the adjacent wires 8.

That is, the recording head of such a conventional kind has sometimes a problem not only in the reliability as described above, but also in the decrease in the productivity.

SUMMARY OF THE INVENTION

An object of the present invention is to overcome these problems.

Another object of the present invention is to provide an ink jet recording head which has a high reliability without any problem of short circuit occurrence, etc., with suppressed production of poor quality products, and which can be obtained at a low cost.

According to the present invention, there is provided an ink jet recording head comprising a liquid discharge member provided for discharging a liquid ink, thereby forming flying droplets, and a support member for supporting the recording head, engaged with the recording head, and having a groove being formed at the engaging surface between the recording head and the support member.

DESCRIPTION OF THE PREFERRED EMBODIMENTS

Figure 1A:
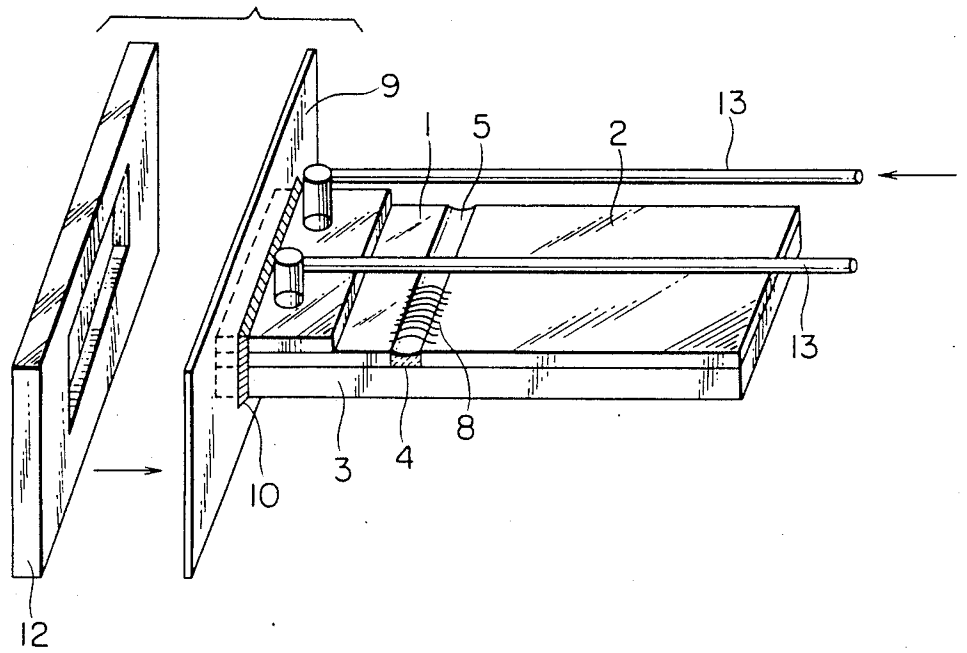
FIG. 1A PRIOR ART
FIGS. 1A and 1B show a perspective view and a cross-sectional view showing one example of the structure of the conventional ink jet recording head, respectively.

An example of the present invention will be described in detail, referring to the drawings.

Figure 1B:
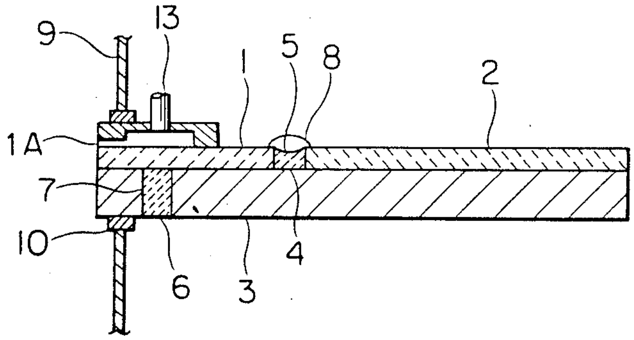
FIG. 1B PRIOR ART
Figure 2A:
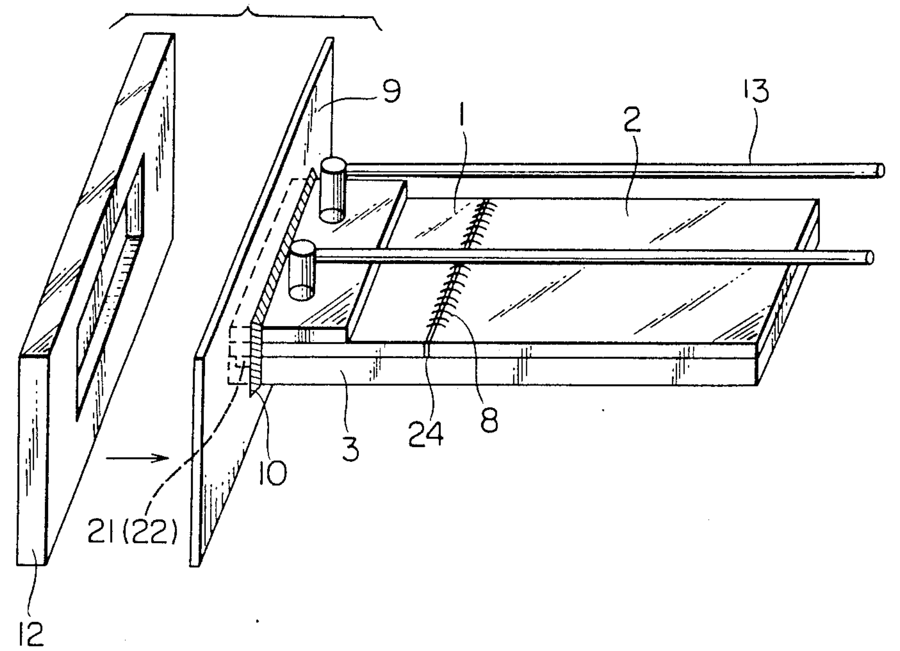
FIGS. 2A and 2B are a perspective view and a cross-sectional view showing one embodiment of the structure of the ink jet recording head of the present invention, respectively.
Figure 2B:
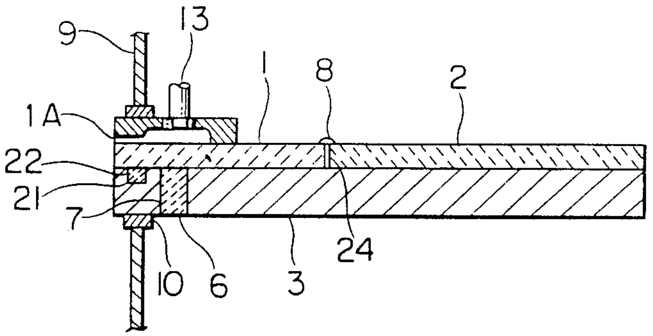

FIGS. 2A and 2B show a preferred embodiment of the present invention, where the same members as in FIG. 1A and 1B are identified with the same symbols to omit their detailed description for simplicity. In this example, a liquid ink permeating along the joint surface between the recording head or second member 1 and the support of first member 3 from the front side of the recording head 1, that is, the side of nozzle 1A, is to be prevented at the position of the joint surface in accordance with the position of a rubber bushing 10 to be provided around the recording head 1 and the support member 3, where numeral 21 is a groove formed on the upper surface of the support member 3 for preventing permeation by the ink, and the groove 21 is provided across the full width of member 3 in accordance with the positions of the front face plate 9 and the bushing 10.

An adhesive 22 is filled into the groove 21 (shown slightly out of its true position in FIG. 2A solely for purposes of illustration) to shut off the permeation of ink to the backward side, i.e. to the joint surface near the drive board 2 by use of the adhesive 22. Other members are the same as in FIGS. 1A and 1B.

In the ink jet recording head as constructed above, the adhesive 22 filled into the groove 21 and the rubber bushing 10 can be kept in contact on both side surfaces of the recording head 1, and the liquid ink having permeated the joint surface between the head 1 and the support member 3 from the front surface can be completely shut off by both adhesive 22 and bushing 10.

Furthermore, the recording head 1 can be thoroughly and strongly bonded to the support member 3 by the adhesives 22 and 7, and thus it is not necessary in the groove 24 provided between the head 1 and the drive board 2 apply any adhesive to between the head 1 and support member 3. The gap groove 24 of a sufficiently short clearance can be provided, so that adhesive is no longer attached to the bonding pads. Even if the wires 8 are connected at a high density, the height of wires 8 in a loop form can be made lower, and the short circuit occurrences by contacting of wires due to their unstable state can be much suppressed.

In this example, one groove 21 for preventing the ink permeation is provided in accordance with the position of rubber bushing, but it is needless to say that two or more grooves can be provided. By providing such grooves at appropriate positions, the ink permeation to the joint surface can be more effectively prevented.

Figure 3:
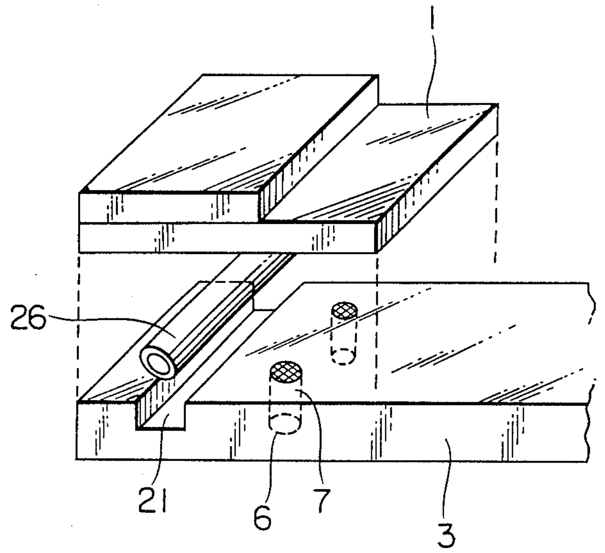
FIG. 3 is an exploded perspective view showing another embodiment of the present invention wherein the joint part between the recording head and the support member is dismantled.

FIG. 3 shows another example of the present invention. As shown there, a packing member, for example, a packing 26 in a tube form, made of an elastomer such as silicone rubber, etc. can be provided in the groove 21 for preventing the ink permeation, the ink permeation can be shut off thereby. In this case, the bonding of the recording head 1 to the support member 3 must be effected by the adhesive 7 inserted in the adhesive opening 6.

With such recording head structure, the labor of inserting a sealant such as an adhesive, etc. into the groove 21 can be saved, and this correspondingly contributes to cost reduction.

In an ink jet recording head, where a recording head provided with a liquid droplet discharging member for ejecting a liquid ink at the tip end, thereby forming flying droplets, and a drive board for feeding a signal for forming the droplets to the recording head are provided on a support member, the thus integrated recording head and support member are supported by a front face plate through an elastomer bushing provided around the discharging member. The recording head is electrically connected to the drive board with a plurality of wires, a groove is provided on the joint surface of the support, on which the recording head is provided, preferably in connection with the position of the elastomer bushing, across the full width in the direction perpendicular to the liquid discharge direction, and a sealant is provided the groove, for example, by inserting an adhesive therein or by providing a packing member therein according to the present invention, as described above. Therefore, not only occurrence of short circuits due to the permeation of ink between the recording head and the support member from the front surface of the recording head and also up to the drive board can be prevented, but also it is not necessary to insert any adhesive into the gap groove between the recording head and the drive board. Furthermore, by maintaining the groove clearance sufficiently small, occurrence of short circuits between the wires provided across the groove can be prevented, and since no adhesive is applied to the groove, the wire bonding pads can be kept clean, and production of poorly connected products can be reduced. This can lead to a cost reduction.

What is claimed is:

1. An ink jet recording head comprising:
   a laminated body formed by a first member and a second member with a common surface therebetween and side surfaces joined by the common surface, the laminated body having an orifice portion for ejecting ink and a wiring portion spaced from the orifice portion for supplying electrical signals to the orifice portion;
   first sealing means disposed at the common surface of the first member and the second member between the orifice portion and wiring portion, the first sealing means extending the width of the laminated body between the side surfaces to prevent ink from traveling along the common surface from the orifice portion to the wiring portion; and
   second sealing means disposed on the side surfaces of the laminated body at a location wherein the second sealing means is in contact with the first sealing means to prevent ink from traveling along the side surfaces from the orifice portion to the wiring portion.

2. An ink jet recording head according to claim 1, wherein the second sealing means has a portion for sealing a lower surface of the laminated body.

3. An ink jet recording head according to claim 2, wherein the portion for sealing the lower surface has a plate for guiding downwardly any ink traveling along the side surfaces toward the second sealing means.

4. An ink jet recording head according to claim 1, wherein the second sealing means has portions for sealing upper and lower surfaces of the laminated body.

5. An ink jet recording head according to claim 4, wherein the portion for sealing the lower surface has a plate for guiding downwardly any ink traveling along the side surfaces toward the second sealing means.

6. An ink jet recording head according to claim 1, wherein the second sealing means is formed so as to guide downwardly any ink traveling along the side surfaces.

7. An ink jet recording head according to claim 1, wherein the second sealing means is formed on both side surfaces and extends the entire thickness of the laminated body.

8. An ink jet recording head according to claim 1, wherein the first sealing means is disposed in a groove formed on the common surface of the first member.

9. An ink jet recording head according to claim 8, wherein a plurality of grooves are provided.

10. An ink jet recording head according to claim 1, wherein the first sealing means comprises an adhesive.

11. An ink jet recording head according to claim 1, wherein the second member comprises the orifice portion and the wiring portion.

12. An ink jet recording head according to claim 11, wherein the second member has an energy generating element for generating energy for discharging ink when electrical signals are supplied thereto through the wiring portion.

13. An ink jet recording head according to claim 1, wherein the wiring portion has a plurality of exposed bonding pads on a surface of the laminated body.

14. An ink jet recording head which comprises:

a recording head unit having an orifice portion with an orifice for discharging ink and a wiring portion spaced from the orifice portion for supplying driving signals to the orifice portion;

a support member joined to the recording head unit and supporting the unit with a common surface therebetween and side surfaces joined by the common surface;

first sealing means disposed at the common surface of the recording unit and the support member between the orifice portion and the wiring portion, the first sealing means extending the width of the support member between the side surfaces to prevent ink from traveling along the common surface from the orifice portion to the wiring portion; and second sealing means disposed on the side surfaces of the recording head unit and the support member at a location wherein the second sealing means is in contact with the first sealing means to prevent ink from traveling along the side surfaces from the orifice portion to the wiring portion.

15. An ink jet recording head according to claim 14, wherein the second sealing means has a portion for sealing a lower surface of the support member.

16. An ink jet recording head according to claim 15, wherein the portion for sealing the lower surface has a plate for guiding downwardly any ink traveling along the side surfaces toward the second sealing means.

17. An ink jet recording head according to claim 14, wherein the second sealing means is formed so as to guide downwardly any ink traveling along the side surfaces.

18. An ink jet recording head according to claim 14, wherein the second sealing means is formed on both side surfaces of the recording head unit and the support member and extends the entire thickness.

19. An ink jet recording head according to claim 14, wherein the first sealing means is disposed in a groove formed on the common surface of the support member.

20. An ink jet recording head according to claim 19, wherein a plurality of grooves are provided.

21. An ink jet recording head according to claim 14, wherein the first sealing means comprises an adhesive.

22. An ink jet recording head according to claim 14, wherein the wiring portion has a plurality of exposed bonding pads on a surface of the recording head unit.

23. An ink jet recording head according to claim 14, wherein the recording head unit has an energy generating element for generating energy for discharging ink when electrical signals are supplied thereto through the wiring portion.

24. An ink jet recording head which comprises:

a recording head unit having an orifice portion with an orifice for discharging ink and a wiring portion spaced from the orifice portion for supplying driving signals to the orifice portion;

a support member joined to the recording head unit and supporting the unit with a common surface therebetween and side surfaces joined by the common surface;

first sealing means disposed at the common surface of the recording head unit and the support member between the orifice portion and the wiring portion, the first sealing means extending the width of the support member between the side surfaces to prevent ink from traveling along the common surface from the orifice portion to the wiring portion; and second sealing means disposed on the side surfaces of the laminated body formed by the recording head unit and the support member at a location wherein the second sealing means is in contact with the first sealing means to prevent ink from traveling along the side surfaces from the orifice portion to the wiring portion.

25. An ink jet recording head according to claim 24, wherein the recording head unit has an energy generating element for generating energy for discharging ink when electrical signals are supplied thereto through the wiring portion.

26. An ink jet recording head according to claim 24, wherein the second sealing means has a support plate and a rubber bushing.

27. An ink jet recording head according to claim 24, wherein the first sealing means is disposed in a groove formed on the common surface of the support member.

28. An ink jet recording head according to claim 24, wherein the first sealing means comprises an adhesive.

29. An ink jet recording head according to claim 27, wherein a plurality of grooves are provided.

30. An ink jet recording head according to claim 24, wherein the wiring portion has a plurality of exposed bonding pads on a surface of the recording head unit.

31. An ink jet recording head which comprises:

a recording head unit having an orifice portion with an orifice for discharging ink and a wiring portion spaced from the orifice portion for supplying driving signals to the orifice portion;

a support member joined to the recording head unit and supporting the unit with a common surface therebetween and side surfaces joined by the common surface;

first sealing means disposed at the common surface of the recording head unit and the support member between the orifice and the wiring portion, the first sealing means extending the width of the support member between the side surfaces to prevent ink from traveling along the common surface from the orifice portion to the wiring portion;

a rubber bushing disposed on the side surfaces of the laminated body formed by the recording head unit and the support member at a location wherein the rubber bushing is in contact with the first sealing means to prevent ink from traveling along the side surfaces from the orifice portion to the wiring portion; and a support plate joined to the rubber bushing having a surface which contacts a cap member for covering the orifice.

32. An ink jet recording head according to claim 31, wherein the recording head unit has an energy generating element for generating energy for discharging ink when electrical signals are supplied thereto through the wiring portion.

33. An ink jet recording head according to claim 31, wherein the first sealing means is disposed in a groove formed on the common surface of the support member.

34. An ink jet recording head according to claim 31, wherein the first sealing means comprises an adhesive.

35. An ink jet recording head according to claim 33, wherein a plurality of grooves are provided.

36. An ink jet recording head according to claim 31, wherein the wiring portion has a plurality of exposed bonding pad on a surface of the recording head unit.

37. An ink jet recording apparatus which comprises:

an ink jet recording head comprising a recording head unit having an orifice portion with an orifice for discharging ink and a wiring portion spaced from the orifice portion for supplying driving signals to the orifice portion, a support member joined to the recording head unit and supporting the unit with a common surface therebetween and side surfaces joined by the common surface, first sealing means disposed at the common surface of the recording head unit and the support member between the orifice and the wiring portion, the first sealing means extending the width of the support member between the side surfaces to prevent ink from traveling along the common surface from the orifice portion to the wiring portion and second sealing disposed on the side surfaces of the laminated body formed by the recording head unit and the support member at a location wherein the second sealing means is in contact with the first sealing means to prevent ink from traveling along the side surfaces from the orifice portion to the wiring portion the second sealing means also having a flat surface portion; and a cap member having a contacting portion for contacting the flat surface portion of the second sealing means and a recessed portion for covering the orifice.

38. An ink jet recording apparatus according to claim 37, wherein the recording head unit has an energy generating element for generating energy for discharging ink when electrical signals are supplied thereto through the wiring portion.

39. An ink jet recording apparatus according to claim 37, wherein the second sealing means has a support plate and a rubber bushing.

40. An ink jet recording apparatus according to claim 37, wherein the first sealing means is disposed in a groove formed on the common surface of the support member.

41. An ink jet recording apparatus according to claim 37, wherein the first sealing means comprises an adhesive.

42. An ink jet recording apparatus according to claim 40, wherein a plurality of grooves are provided.

43. An ink jet recording apparatus according to claim 37, wherein the wiring portion has a plurality of exposed bonding pads on a surface of the recording head unit.

44. An ink jet recording apparatus which comprises:

an ink jet recording head comprising a recording head unit having an orifice portion with an orifice for discharging ink and a wiring portion spaced from the orifice portion for feeding driving signalS to the orifice portion, and a support member joined to the recording head unit and supporting the unit with a common surface therebetween and side surfaces joined by the common surface, first sealing means disposed at the common surface of the recording head unit and the support member between the orifice and the wiring portion, the first sealing means extending the width of the support member between the side surfaces to prevent ink from traveling along the common surface from the orifice portion to the wiring portion and second sealing means disposed on the side surfaces of the laminated body formed by the recording head unit and the support member at a location wherein the second sealing means is in contact with the first sealing means to prevent ink from traveling along the side surfaces from the orifice portion to the wiring portion the second sealing means also having a flat surface portion;

a cap member having a contacting portion for contacting the flat surface portion of the second sealing means and a recessed portion for covering the orifice; and recovery pumping means for exhausting ink through the orifice.

45. An ink jet recording head which comprises:

a laminated body formed by a first member and a second member with a common surface therbetween and side surfaces joined by the common surface, the laminated body having an orifice portion with an orifice for ejecting ink and a wiring portion spaced from the orifice portion for supplying electrical signals to the orifice portion, first sealing means disposed at the common surface of the first member and the second member between the orifice and the wiring portion, the first sealing means extending the width of the laminated body between the side surfaces to prevent ink from traveling along the common surface from the orifice portion to the wiring portion; and second sealing means disposed on the side surfaces of the laminated body at a location wherein the second sealing means is in contact with the first sealing means to prevent ink from traveling along the side surfaces from the orifice portion to the wiring portion.

* * * * *

UNITED STATES PATENT AND TRADEMARK OFFICE
CERTIFICATE OF CORRECTION

PATENT NO. : 4,901,091

DATED : February 13, 1990

INVENTOR(S) : MASAMI KASAMOTO

It is certified that error appears in the above-identified patent and that said Letters Patent is hereby corrected as shown below:

COLUMN 1

Line 41, "singnal" should read --signal--.
Line 54, "recoverying" should read --recovering--.

COLUMN 2

Line 47, "dismantled;" should read --dismantled.--.
Line 59, "of first" should read --or first--.

COLUMN 3

Line 18, "apply" should read --to apply--.
Line 36, "permeation, the" should read --permeation, and the--.
Line 60, "provided" should read --provided in--.

COLUMN 7

Line 3, "bonding pad" should read--bonding pads--.
Line 20, "sealing" should read --sealing means--.
Line 26, "tion" should read --tion,--.

UNITED STATES PATENT AND TRADEMARK OFFICE

CERTIFICATE OF CORRECTION

PATENT NO. : 4,901,091

DATED : February 13, 1990

INVENTOR(S) : MASAMI KASAMOTO

It is certified that error appears in the above-identified patent and that said Letters Patent is hereby corrected as shown below:

COLUMN 8

Line 5, "signalS" should read --signals--.
Line 23, "portion" should read --portion,--.
Line 33, "therbe-" should read --therebe- --.

Signed and Sealed this

Third Day of September, 1991

Attest:

HARRY F. MANBECK, JR.

*Attesting Officer*

*Commissioner of Patents and Trademarks*